Dec. 21, 1965  G. F. R. BUDESHEIM  3,224,038
APPARATUS FOR THE MANUFACTURE OF BLOWN, HOLLOW ARTICLES
Filed Feb. 18, 1963  4 Sheets-Sheet 3
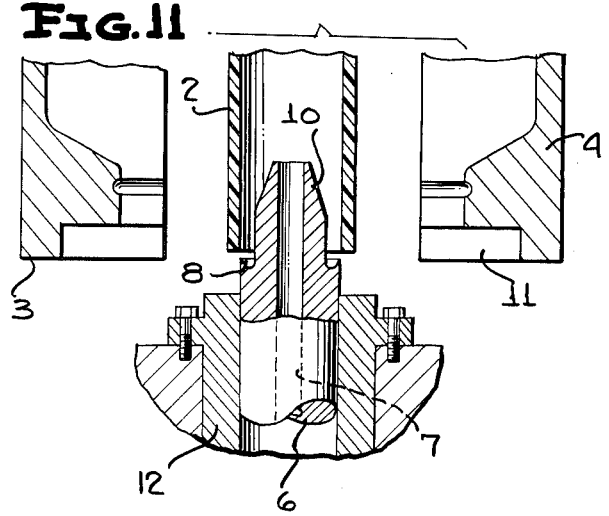
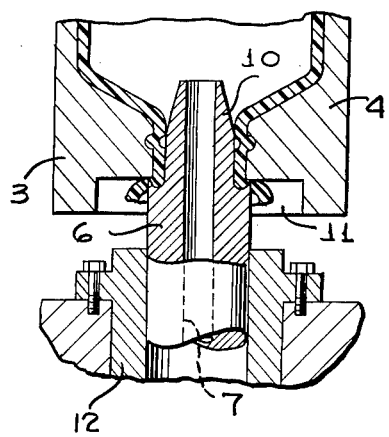
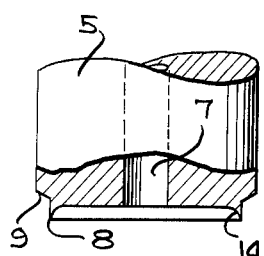
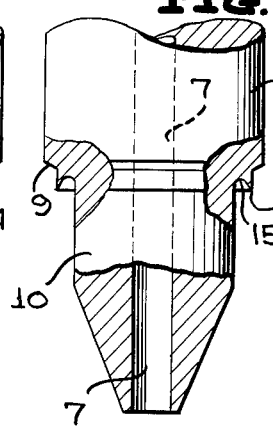
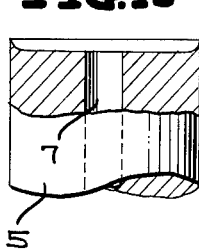
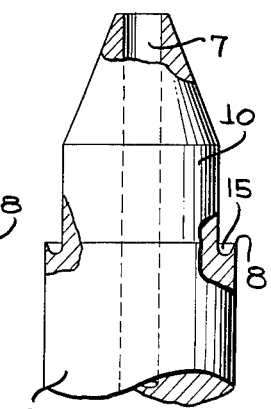
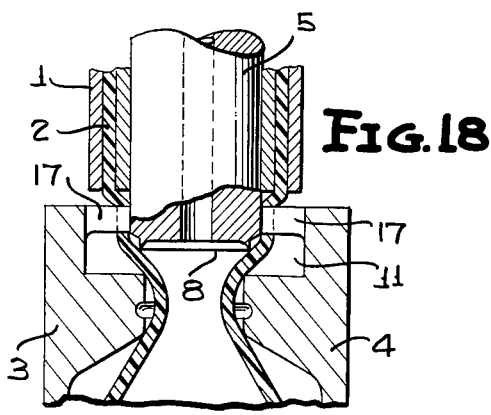
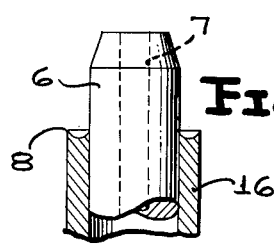
INVENTOR
GEORG FRIEDRICH ROLF BUDESHEIM
BY Mason, Porter, Diller & Stewart
ATTORNEYS Dec. 21, 1965   G. F. R. BUDESHEIM   3,224,038
APPARATUS FOR THE MANUFACTURE OF BLOWN, HOLLOW ARTICLES
Filed Feb. 18, 1963   4 Sheets-Sheet 4

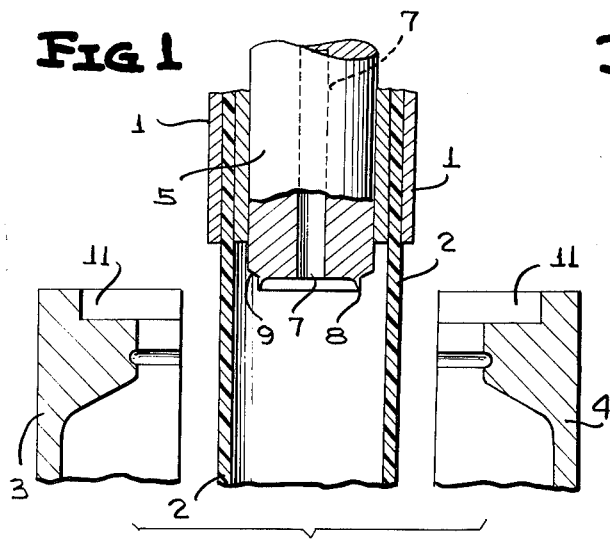
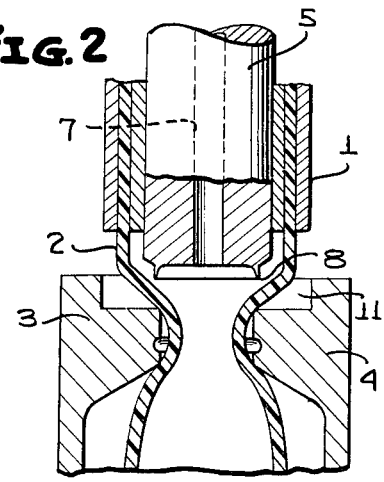
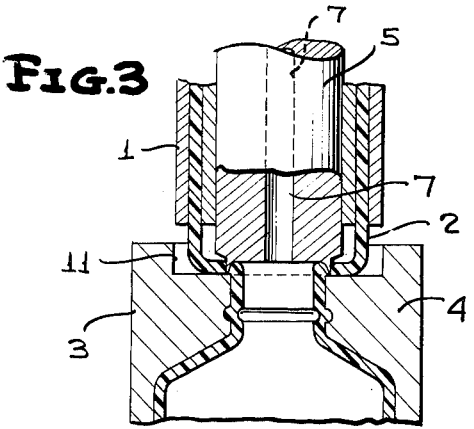
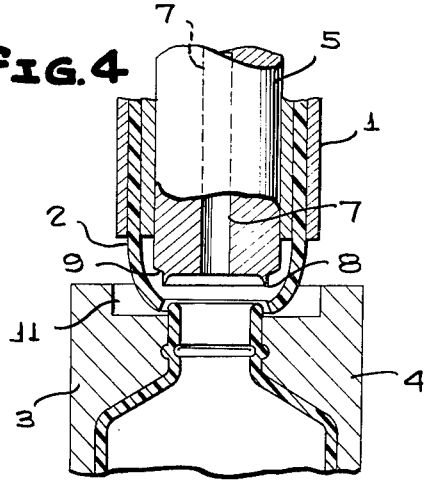
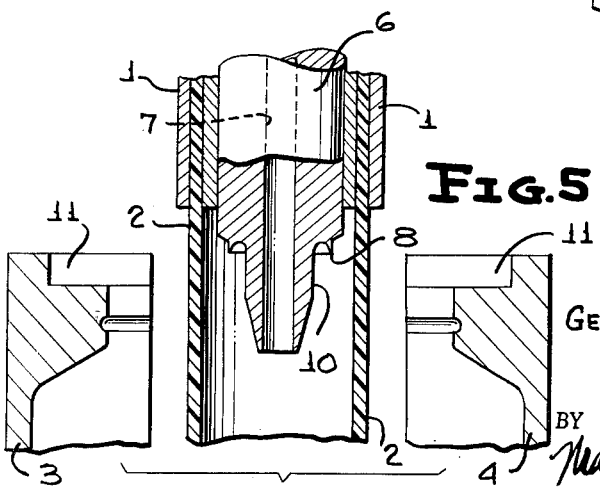

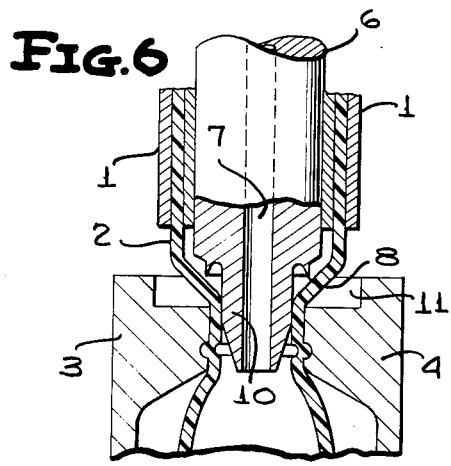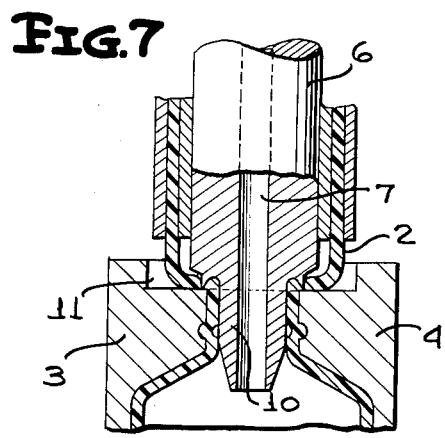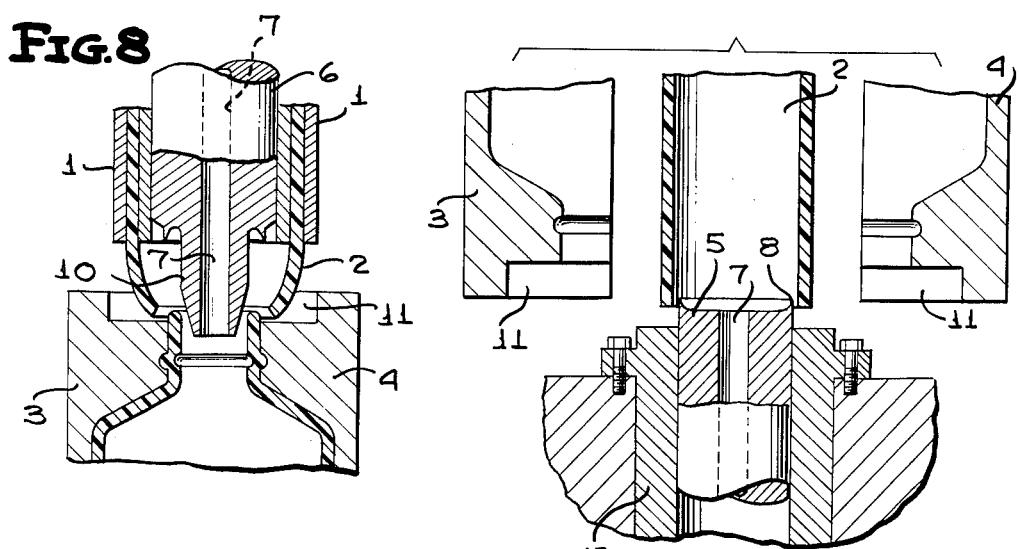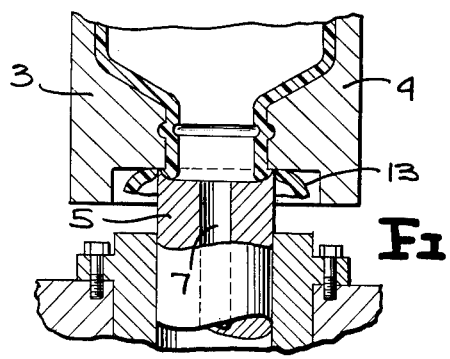

INVENTOR
GEORG FRIEDRICH ROLF BUDESHEIM

BY
*Mason, Porter, Diller & Stewart*
ATTORNEYS

United States Patent Office 3,224,038
Patented Dec. 21, 1965

3,224,038
APPARATUS FOR THE MANUFACTURE OF
BLOWN, HOLLOW ARTICLES
Georg Friedrich Rolf Budesheim, Klein-Schoeppenstedt,
Germany, assignor to J. A. Schmalbach Aktiengesellschaft, Braunschweig, Germany
Filed Feb. 18, 1963, Ser. No. 259,207
Claims priority, application Germany, Mar. 28, 1962,
Sch 31,211
11 Claims. (Cl. 18—5)

The invention deals with a device for the manufacture of blown, hollow articles, especially bottles, from a thermoplastic polymer, whereby an open hose or tube of the plastic discharged from a spraying or extruding nozzle is introduced into a mold which consists of several parts, the tube then being closed due to the closing of the mold at one end to form the bottom of the hollow article, and thereafter blown up within the closed mold by a blowing nozzle which reaches into the other end of the tube, said other end of the tube serving to form the neck of the blown, hollow article.

The manufacture of a blown, hollow article in this manner is accomplished, generally speaking, in two ways: According to one practice, the hollow article is blown in the upright position, i.e., the neck region of the mold faces the tube as it leaves the extruding nozzle, and correspondingly the blowing nozzle, which is projected inside said tube, can be moved from top to bottom or downwardly. According to the other practice, the hollow article is blown "overhead," i.e., the mold with its neck region faces away from the extruded tube, and correspondingly, the blowing nozzle also must be at this side. In each of these two practices, the tube is squeezed off automatically in the bottom region of the mold by the cutting edges provided at this position on the mold, and simultaneously a closing of the tube is brought about at the squeeze-off locale.

For the separation of the tube or of the residual tube, respectively, in the region of the neck of the hollow article, special cutting means must be provided. Devices known in the prior art have employed molds equipped with cutting knives, which cut off the tube or residual tube, respectively, against the blowing peg which projects into the neck and either imparts the shape, or correct caliber, to the interior of the neck or serves to provide a free blowing of the tube, whereby simultaneously a sealing effect is produced such as is necessary in a proper blowing of a bottle or other hollow article. Because, in some instances, the blowing mold is subdivided in two portions in the direction of the tube, so that the finished, blown, hollow article can be removed from it, one must subdivide the cutting knives also. Thus, if the neck opening is circular, the knife will have to be divided into two semicircles, and therefore two oppositely located cut edges (burrs, seams, overflows from the mold) always will remain upon the cut surface which has the shape of an annular ring. These burrs or seams can only with difficulty be removed in the absence of special machining, and will render rather difficult the sealing of a closure placed upon the neck, if the polymer is rather rigid and of high tensile strength.

One worker in the art has tried to overcome the disadvantages mentioned by equipping a blowing nozzle, which was shaped as a calibrating mandrel, with a cutting edge which protruded towards the outside and was of annular shape. This cutting edge which preferably forms one piece with the mandrel, as by being ground thereon, will cut the tube within the mold and in the upper neck region. The disadvantage of this embodiment is that the cut-off remainder of the tube, which as the tail of the manufactured article will remain upon the mandrel above the cutting edge, can be removed only with considerable difficulty, and as a rule, one will have to provide a special strip-off part to accomplish this purpose. Another disadvantage resides in the fact that in blowing machines wherein the blowing nozzle is formed to serve simultaneously as a calibrating mandrel, said nozzle protrudes into the mold from below, and will cause great trouble to attach the tube to the mandrel in a way that in the act of being pulled across, it will not get stuck to or get cut by the cutting edge. In addition, this embodiment can be advantageously used only in devices which include a calibration mandrel.

The present invention overcomes the disadvantages hereinabove mentioned rather thoroughly. The invention resides in providing a blowing nozzle equipped with a blade the cutting edge of which goes in parallel to the longitudinal axis of the nozzle and in a direction toward the mold, and the diameter of which cutting edge is greater than the diameter of the neck opening of the mold. The act of cutting in this construction occurs at the moment when the blowing nozzle is moved against the mold, namely, when the mold is already closed. Thereby, the cutting edge will cut the tube against the opposing portion of the mold which lies perpendicular to the tube axis. Such applications can be employed with nozzles which blow the neck free, i.e., without contact with a mandrel, and also with nozzles which include an elongation into a calibrating mandrel. Another advantage of the invention is that the upper edge of the neck or the area of the ring of the neck may be shaped into a round or any other form, without the objectionable provision of any disturbing burr or seam.

According to other characteristics of the invention, the blade may be placed either at the transition spot or intermediate position on the blowing nozzle at which it runs out into a calibration end of smaller diameter, or at the free end of the nozzle. In the latter case, the blade in its diameter is smaller than the blowing nozzle, if the latter can be moved from top to bottom or downwardly. It is preferred that the nozzle and blade be made in one piece. However, the blade may consist of a part which is connected to the blowing nozzle in a way that the connection can be opened, in which case the nozzle would be annular in shape.

According to a further development of the invention, the blade is placed in a sheath (bushing, sleeve) which surrounds the blowing nozzle, which sleeve, according to still another characteristic of the invention, can be moved in the same direction as the blowing nozzle, dependent upon the latter, or completely independently thereof.

The blade preferably is annular in shape and is arranged concentrically to the blowing nozzle, in the manner of a ring cutting edge. However, the blade may also be oval or of still another shape, in correspondence with the desired shape of the container neck.

According to still another characteristic of the invention, the shape of the inlet region of the blow mold is recessed or grooved. Also, in order to center the nozzle according to yet another characteristic of the invention, inside such recess or groove are provided means, like radial crossbars or setscrews.

Other characteristics can be recognized from the following specifications which are given on hand of some typical examples which have been shown in the attached sheets of drawings.

In the drawings:

FIGURES 1 through 4 are fragmentary vertical cross-sectional views showing the upper portion of a mold with a blowing nozzle which can be moved from top to bottom, according to the invention, and which is provided with a concentric, annular blade, four successive and characteristic steps of the procedure being shown in the respective views.

FIGURES 5 through 8 are views similar to FIGURES 1 through 4 and illustrating an arrangement in which the blowing nozzle includes an elongation in the form of a neck calibrating mandrel.

FIGURES 9 and 10 are fragmentary vertical cross-sectional views showing the lower portion of the mold with a blowing nozzle which can be moved from bottom to top, according to the invention, and which is provided with a concentric, annular blade, two successive and characteristic steps of the procedure being shown in the respective views.

FIGURES 11 and 12 are views similar to FIGURES 9 and 10 and showing an arrangement in which the blowing nozzle includes an elongation in the form of a neck calibrating mandrel.

FIGURES 13 through 16 are fragmentary views partially in side elevation and partially in section and showing different embodiments of the blowing nozzle, according to the invention, the nozzles of FIGURES 14 and 16 including the calibrating mandrel extension and FIGURES 13 and 15 being devoid of said extension.

FIGURE 17 is a view similar to FIGURES 13 and 15 and showing a modified blast-nozzle arrangement wherein the annular blade is provided on an annular sleeve.

FIGURE 18 is a view similar to FIGURE 2 showing a blowing nozzle according to the invention, and radial cross-bar means for centering the nozzle.

Figure 19:
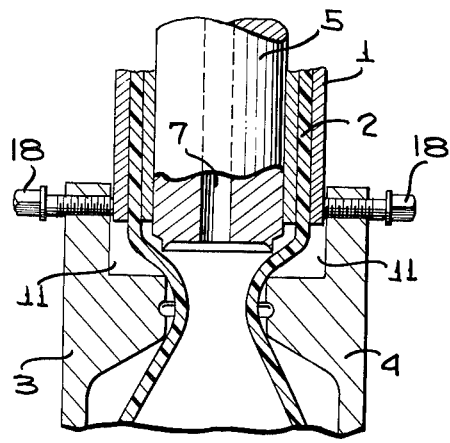

FIGURE 19 is a view similar to FIGURE 18 and showing setscrew means for centering the nozzle.

Figure 20:
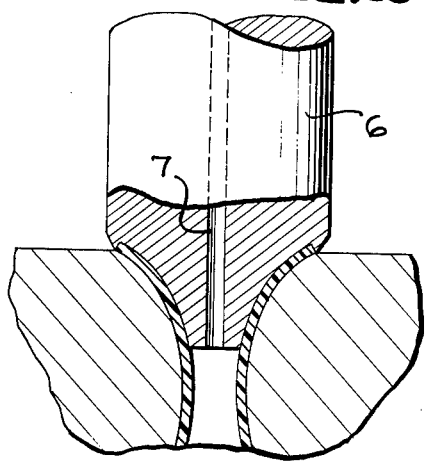
Figure 21:
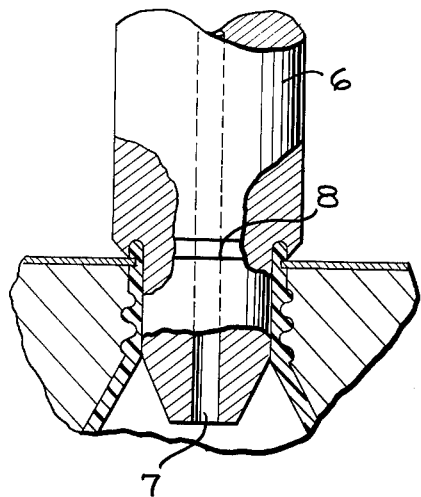
Figure 22:
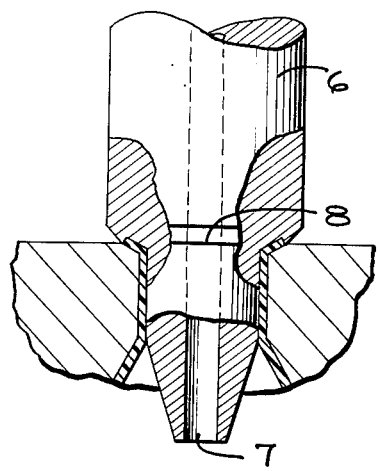

FIGURES 20, 21 and 22 are fragmentary views partly in side elevation and partly in section showing various hollow article neck openings and blowing nozzle structures according to the invention.

In the figures of the drawings, there have been drawn schematically only the part portions adjacent the vicinity of the neck region of the mold, this for purposes of simplification of illustration.

The FIGURES 1 through 4 show in four typical steps of the procedure how a hollow article is manufactured; 1 is the spraying or extruding nozzle of an extruder or a plodder, which nozzle is directed downwardly and extrudes or ejects a hose or tube 2 of a thermoplastic polymer. Directly underneath the nozzle 1 is a mold which consists of the two halves 3, 4. The regions of these mold halves 3, 4 which shape the neck of the hollow body in this case are directed against the tube 2 which leaves the nozzle, or against this nozzle, respectively. Within the extruding nozzle is placed a blowing nozzle which can be moved from top to bottom, i.e., against the mold.

In the typical examples of embodiment of the invention here shown in FIGURES 1 through 8, two kinds or forms of blowing nozzles are shown, one, in FIGURES 1 through 4 being a blowing nozzle 5 for the free-blowing (without guide along a solid wall) of the neck, whereas in FIGURES 5 through 8, a nozzle 6 is shown which includes a downward extension in the shape of a calibration mandrel. Both embodiments of the blowing nozzle have this in common that they have a concentric channel 7 for the blowing medium. The numeral 8 designates a concentric, annular blade, the cutting edge of which goes in parallel to the longitudinal axis of the nozzle and in the direction towards mold 3, 4, and it is to be noted that the diameter of the annular blade 8 is greater than the diameter of the neck opening of the mold 3, 4. This annular blade is placed in correspondence with the construction of the blowing nozzle 5 of FIGURES 1 through 4, at the free end, and the blade has a smaller diameter than the nozzle. The annular blade 8 runs out into an inclined (tapered) portion 9 which in its turn runs out into the nozzle itself. This characteristic feature provides the advantage that upon withdrawal of the blowing nozzle 5, the risk of entraining of material is avoided.

In the form of the invention shown in FIGURES 5 through 8, the blowing nozzle 6 runs out into a calibrating end 10 with a smaller diameter. The annular blade 8 thus is arranged at the transition or juncture of the main body of the nozzle and the calibration end extension. It, too, runs out, across a tapered-off intermediate part, into the body of the nozzle itself.

As one may derive from the figures of the drawings, each mold half 3, 4 has a recess 11 in the region of the neck, which recess serves the purpose that the nozzle has enough space when the act of cutting occurs, as will be apparent by reference to FIGURES 2, 3, 6 and 7. This recessing at 11 also serves to accommodate means for the centering of the nozzle, which will be described hereinafter.

At the step of the procedure shown in FIGURES 2 and 6, the mold halves 3, 4 have become closed. It will be noted in FIGURE 6 that the nozzle 6 which is equipped with a calibration end 10 serves to provide for a calibration of the internal neck wall, whereas at the nozzle 5 of FIGURE 2, the tube or hose 2 does not contact the tube wall intimately, because the blowing medium has not yet been injected into the tube, the tube having been simply created by free extrusion. One may also visualize that the calibration end 10 will immerse into the region of the neck, only when the mold 3, 4, has become completely closed.

FIGURES 3 and 7 show that the blowing nozzles (indicated always by the numerals 5 and 6) have become lowered, this being followed by an injection of the blowing medium through the channel 7, which forces the tube 2 towards the mold wall, thus to impart to the article its final shape. Whereas the calibration end 10 of the nozzle shown in FIGURE 7 shapes the internal region of the neck, this same neck region at the nozzle 5 in FIGURE 3 is shaped by an inflating blowing action.

As this step of each procedure of FIGURES 3 and 7, respectively, is enacted, the nozzle 5 or 6 is lowered to a point where its annular blade 8, cutting through the plastic tube 2, will come to rest against the mold at the bottom of the recess 11, this being the cutting surface. When this occurs, the upper edge of the neck is created also, as will be apparent by reference to FIGURES 3, 4 and 7, 8.

The blowing nozzle 5 according to the step of the procedure shown in FIGURES 4 and 8, is returned to its upper-most position, and, of course, the blowing nozzle 6 which carries the calibration end 10 must be pulled out far enough so that the container neck lies completely free. The mold halves 3, 4 may then be opened, and the blown bottle is thrown out.

The blowing procedure in which the bottle is blown "overhead" operates correspondingly; in this case, of course, the blowing nozzle is located underneath the mold and can be moved upwardly in the vertical direction. Such an arrangement has been drawn in two steps of the procedure in FIGURES 9 and 10, 11 and 12. The numerals 3 and 4 again designate the mold halves. The tube 2 is extruded in the same manner by an extruding nozzle (not shown) which is located above the mold. The blowing nozzle, at the end of which with the orifice of the centrically located channel 7 in this case points upwardly, is placed in a stationary guide or slide 12. The FIGURES 9 and 10 show a blowing nozzle 5 for the free blowing of the neck, whereas the FIGURES 11 and 12 show a blowing nozzle 6 which is equipped with a calibration end 10. The annular blade 8 is placed in the same manner described in the preceding typical example. In this arrangement, the calibration end 10 shapes the inner region of the neck as previously described.

The numeral 13 designates the stub or residue of the tube which remains after the act of cutting and is then removed.

In FIGURES 13 through 17 have been shown the various embodiments of the blowing nozzle in detail.

The nozzles according to FIGURES 13 and 14 will find application in devices wherein the hollow article is blown in the upright position, and therefore, the nozzle operates from top towards bottom in parallel with the extruded tube. The nozzles according to FIGURES 15 and 16 are for use in devices wherein the hollow article is blown "overhead," and therefore the nozzles have to be introduced from below upwardly into the lower mold region. The nozzles according to FIGURES 13 and 15 will serve for a free-blowing of the neck, whereas the nozzles according to FIGURES 14 and 16 calibrate the internal wall of the neck. In all the cases, the annular blade 8 and the blowing nozzle are made of one piece. The blade, for example, could be formed right in the blowing nozzle by a corresponding grinding, but one may also shape the annular blade as a separate part which is screwed or shrunk upon the blowing nozzle 5, 6, so that it can be removed therefrom whenever desired. However, during the actual operation, or with respect to performance, the blade and the blast-nozzle always behave like one part. The diameter of the annular blade 8 in all cases is greater than the neck opening of the mold, so that the cutting occurs against the bottom of the recess 11.

In the typical examples shown, especially FIGURES 13 through 16, one may recognize that the annular blade has a round shoulder 14, or runs out into the calibration mandrel or end extension 10 with interposition of a round groove 15. This groove and blade placement serves in both cases for the shaping of the upper neck edge of the hollow article. It is to be understood, however, that the shoulder 14 or the transition, respectively, need not be rounded, but could be inclined, chamfered or could have still another suitable shape.

FIGURE 17 shows a blast-nozzle arrangement in which the annular blade is provided on a sleeve 16, which surrounds the blast-nozzle and may be moved in the same direction as this blast-nozzle (blowing nozzle), as a function of its motion, or independently thereof. Such a sleeve 16 may be used instead of the other embodiments of blowing nozzles shown. The advantage of the cutting sleeve 16 is that a moving of the mass of the tube, which can easily occur upon insertion of the calibration mandrel with its blade, is effectively avoided.

In order to bring about a forced (kinematically) motion of the blast-nozzles, and therefore an accurate cutting action of the annular blade 8 in the region of the recess 11 of the mold, means for the centering of the blowing nozzle (blast-nozzle) may be provided. Such means are shown in FIGURES 18 and 19. FIGURE 18 shows in the upper region of the mold recess 11, crossbars or guides 17 which are arranged radially and are directed towards the nozzle 5. These crossbars serve collectively as a guide means when the nozzle 5 is moved downwardly, so that a completely centered position of the nozzle is guaranteed. Instead of the cross-bars 17, one may also use setscrews 18 which can be turned from the outside of the mold and which protrude into the recess 11 as shown in FIGURE 19. In the embodiment of FIGURE 19, the outer region of the mold 3, 4 has been projected out far enough so that the setscrews come to rest at or engage and center the spraying or extruder nozzle. It is recommended that at least three such crossbars 17 or setscrews 18 be employed.

The FIGURES 20 through 22 show various other constructions of blast-mandrels with correspondingly arranged cutting edges 8 for the shaping of special necks of hollow articles. Thus, for example, the embodiment according to FIGURE 20 will shape the neck of a trumpet, such as one likes to see in blown vases and ornamental bottles. FIGURE 21 shows how by the special positioning of the annular blade edge 8, a round, beaded edge is created which provides a dropping spout (medicine dropping bottle), and in the construction shown in FIGURE 21, a chamfered edge of the hollow article can be created. The arrangements of the annular blade shown here or the transition into the calibrating end, respectively, may be applied in the same form or in a somewhat changed form to hollow articles which are shaped conventionally.

In order that the subject matter of the invention really shall be effective, it is important that the blade is closed in itself, as only this way the upper edge of the neck can be manufactured free from burrs. In the typical examples always only one concentric annular blade 8 has been shown and described, this for the reason that this embodiment is the simplest, is easily drawn and can be described with a few words. As has been mentioned, the blade need not necessarily be annular and lie concentrically to the nozzle axis; it also may be shaped in any other form, like ovally, depending upon the kind and shape of the neck of the hollow article being formed.

In all the embodiments shown, in order to assure that upon closing of the mold halves the tube which was flatly squeezed off will not stick, during or before the closing, respectively, of the mold halves, one may apply a blast of low-pressure air; due to which blast the tube before the cutting and before the main blast will make a better contact in the neck region.

The blade according to the invention may not only be used in combination with a blast and/or calibration mandrel, but also as independently operating cutting mandrel. In this case, one could manufacture bottles by aid of an injection with a hollow needle.

What is claimed is:

1. In an apparatus for the manufacture of blown bottles; said apparatus being of the type including a mold having separable parts cooperable when brought together to close the mold to provide a mold cavity including a neck opening, means for delivering a tube of thermoplastic material into said mold, and a blast nozzle disposable within a portion of said tube; the improvement comprising, said blast nozzle being equipped with a cutting blade extending parallel to the axis of the blast nozzle and including a continuous annular cutting edge which is presented toward said mold and disposable within said tube for tube-cutting engagement against said mold.

2. Apparatus as defined in claim 1 wherein the blade edge has a diameter which is greater than the diameter of the neck opening in the closed mold.

3. Apparatus as defined in claim 1 wherein the blade is carried at the mold opposing end extremity of the blast nozzle.

4. Apparatus as defined in claim 1 wherein the blast nozzle tapers off into a reduced diameter hollow article neck calibrating end extension, the blade being placed at the juncture of said extension and the blast nozzle.

5. Apparatus as defined is claim 1 wherein the blast nozzle tapers off into a reduced diameter hollow article neck calibrating end extension, the blade being placed at the juncture of said extension and the blast nozzle, and the blast nozzle and blade being formed in one piece.

6. Apparatus as defined in claim 1 wherein the blast nozzle tapers off into a reduced diameter hollow article neck calibrating end extension, the blade being placed at the juncture of said extension and the blast nozzle and being arranged annularly and concentrically to the blast nozzle end extension.

7. Apparatus as defined in claim 1 wherein the mold is recessed in the entry region of the blast nozzle and provides a bottom portion opposed to the cutting edge of the blade.

8. Apparatus as defined in claim 1 wherein the mold is recessed in the entry region of the blast nozzle and provides a bottom portion opposed to the cutting edge of the blade, means being provided in the mold recess for centering the blast nozzle.

9. Apparatus defined in claim 1 wherein the blade is carried at the mold opposing end extremity of the blast nozzle and has a diameter which is greater than the diameter of the neck opening in the closed mold and smaller than the diameter of the blast nozzle, said mold being recessed in the entry region of the blast nozzle and providing a portion opposed to the cutting edge of the blade.

10. In an apparatus for the manufacture of blown bottles; said apparatus being of the type including a mold having separable parts cooperable when brought together to close the mold to provide a mold cavity including a neck opening, means for delivering a tube of thermoplastic material into said mold, and a blast nozzle disposable within a portion of said tube; the improvement comprising, said blast nozzle being equipped with a cutting blade extending parallel to the axis of the blast nozzle and including a cutting edge which is presented toward said mold and disposable within said tube for tube-cutting engagement against said mold, said blast nozzle being provided with a round shoulder adjacent to and inwardly of said cutting edge whereby severing of said tube results in the formation of an accurately molded mouth rim, said mold being recessed in the entry region of the blast nozzle and providing a portion opposed to said cutting edge, and crossbars being provided in the mold recess for centering said blast nozzle.

11. In an apparatus for the manufacture of blown bottles; said apparatus being of the type including a mold having separable parts cooperable when brought together to close the mold to provide a mold cavity including a neck opening, means for delivering a tube of thermoplastic material into said mold, and a blast nozzle disposable within a portion of said tube; the improvement comprising, said blast nozzle being equipped with a cutting blade extending parallel to the axis of the blast nozzle and including a cutting edge which is presented toward said mold and disposable within said tube for tube-cutting engagement against said mold, said blast nozzle tapering off into a reduced diameter hollow article neck calibrating end extension, said cutting blade being placed at the juncture of said extension and the blast nozzle and being outwardly spaced therefrom to provide an interposed rounded groove whereby severing of said tube results in the formation of an accurately molded mouth rim, said mold being recessed in the entry region of said blast nozzle and providing a portion opposed to said cutting edge, and means being provided in the mold recess for centering said blast nozzle.

References Cited by the Examiner
UNITED STATES PATENTS

| | | | |
|---|---|---|---|
| 2,175,053 | 10/1939 | Ferngren | 18—5 XR |
| 2,936,481 | 5/1960 | Wilkalis et al. | 18—5 |
| 2,984,865 | 5/1961 | Mumford | 18—5 XR |
| 3,009,196 | 11/1961 | Hagen | 18—55 |
| 3,071,812 | 1/1963 | Miller | 18—21 |

WILLIAM J. STEPHENSON, *Primary Examiner.*

MICHAEL V. BRINDISI, *Examiner.*